(12) United States Patent
Mohs et al.

(10) Patent No.: US 12,360,005 B2
(45) Date of Patent: **\*Jul. 15, 2025**

(54) EXTENDING DAS RANGE IN UNDERSEA CABLES USING LOOPBACKS

(71) Applicant: SUBCOM, LLC, Eatontown, NJ (US)

(72) Inventors: Georg Heinrich Mohs, East Brunswick, NJ (US); Alexei N. Pilipetskii, Colts Neck, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,744

(22) Filed: Jun. 6, 2024

(65) Prior Publication Data

US 2024/0328895 A1 Oct. 3, 2024

Related U.S. Application Data

(63) Continuation of application No. 17/135,065, filed on Dec. 28, 2020, now Pat. No. 12,038,345.

(51) Int. Cl.
| | | |
|---|---|---|
| *G01M 11/08* | (2006.01) | |
| *H01S 3/067* | (2006.01) | |
| *H01S 3/16* | (2006.01) | |
| *H01S 3/23* | (2006.01) | |

(52) U.S. Cl.
CPC ....... *G01M 11/088* (2013.01); *H01S 3/06716* (2013.01); *H01S 3/06754* (2013.01); *H01S 3/06787* (2013.01); *H01S 3/1608* (2013.01); *H01S 3/2316* (2013.01)

(58) Field of Classification Search
CPC .. G01H 1/00; G01H 1/06; G01H 1/08; G01H 1/04; G01H 3/00; G01M 11/083; G01M 11/085; G01M 11/088; H01S 3/06716; H01S 3/1608; H01S 3/2316
See application file for complete search history.

(56) References Cited

U.S. PATENT DOCUMENTS

| | | |
|---|---|---|
| 11,920,975 B2 | 3/2024 | Ip |
| 2018/0274953 A1 | 9/2018 | Molteni |

FOREIGN PATENT DOCUMENTS

| | | |
|---|---|---|
| GB | 2546717 B | 4/2021 |

*Primary Examiner* — Tina Wong
*Assistant Examiner* — Mary A El-Shammaa
(74) *Attorney, Agent, or Firm* — KDW Firm PLLC

(57) ABSTRACT

Techniques for extending distributed acoustic sensing (DAS) range in undersea optical cables are provided. For example, DAS range can be extended by transmitting and amplifying a DAS signal along multiple spans of a first optical fiber, routing or bypassing the DAS signal from the first optical fiber to a second optical fiber different from the first fiber via a high-loss loopback architecture, and returning and amplifying the DAS signal along the same multiple spans back to a DAS device. The DAS device may then receive and process the DAS signal to detect any changes in the DAS environment. The loopback configuration may be based on different types of loopback architecture.

10 Claims, 7 Drawing Sheets

200

300

400

600

EXTENDING DAS RANGE IN UNDERSEA CABLES USING LOOPBACKS

CROSS-REFERENCE TO RELATED APPLICATIONS

This application is a continuation of U.S. nonprovisional patent application Ser. No. 17/135,065 filed Dec. 28, 2020, the entirety of which applications are incorporated by reference herein for all purposes.

BACKGROUND OF THE INVENTION

Field of the Invention

Embodiments of the present disclosure relate to the field of optical communication systems. More particularly, the present disclosure relates to at least techniques for extending the range of distributed acoustic sensing (DAS) in undersea optical cables using loopbacks.

Discussion of Related Art

In a distributed acoustic sensing (DAS) system, an optical cable may be used to provide real-time or near real-time distributed strain sensing. In other words, the cable itself may be used as a sensing element to detect or monitor different types of disruptions, interferences, irregularities, activities, naturally occurring events, acoustic vibrations, etc. in the DAS environment (e.g., terrestrial environment, undersea environment). To do so, an optoelectronic device coupled to the optical cable of the DAS system may detect and process reflected light signals (e.g., acoustic frequency strain signals) over a specific distance in the DAS environment.

For example, the DAS system may be based on Rayleigh scattering (otherwise referred to as a Rayleigh-scattering-based DAS system). In this system, a coherent laser pulse may be sent along an optical fiber, and scattering sites within the optical fiber may cause the fiber to act as a distributed interferometer, e.g., with a gauge length approximately equal to the pulse length. The intensity of any reflected light may be measured as a function of time after transmission of the laser pulse, which is known as Coherent Rayleigh Optical Time Domain Reflectometry (COTDR).

When the laser pulse has traveled the full length of the optical fiber and back, the next laser pulse may be sent along the fiber. Changes in the reflected intensity of successive laser pulses from the same region of the fiber may be caused by changes in the optical path length of that section of the fiber. The Rayleigh-scattering-based DAS system is typically sensitive to both strain and temperature variations of the fiber, and thus, measurements can be made by the optoelectronic device almost simultaneously at all sections of the fiber.

In the Rayleigh-scattering-based DAS system, the laser pulse may be attenuated as it propagates along the optical fiber, where typical attenuation may exhibit approximately 0.2 dB optical loss per kilometer for a single mode fiber operating at 1550 nanometers. Because the laser pulse must make a double pass along the fiber, each kilometer in cable length may cause approximately 0.4 dB of optical loss. Thus, the "maximum range" of the optoelectronic device of the DAS system corresponds to when the amplitude of the reflected pulse becomes so low that it is impossible for the optoelectronic device to obtain or decipher a clear signal therefrom. Generally, the maximum range is approximately between 40 to 50 km from a coupled optoelectronic device or whenever the range reaches approximately 10 to 12 dB of total optical loss. Accordingly, the DAS range and sensing capabilities of the DAS system is significantly limited, and in most instances, the sensing range is limited to a single fiber span.

To account for this limitation, conventional DAS solutions may string or link together numerous standalone optoelectronic devices to cover a desired range, where each standalone optoelectronic device monitors its respective range-limited fiber span. Thus, each of the optoelectronic devices and their coupled fibers effectively form and act as separate DAS systems. Not only is this conventional solution incredibly expensive (e.g., since extending the desired range requires more and more standalone optoelectronic devices and related components), but the design thereof is also prohibitive and impracticable (or even impossible) in underwater or subsea environments or applications.

SUMMARY OF THE INVENTION

Techniques for extending distributed acoustic sensing (DAS) range in undersea optical cables are provided. For example, DAS range can be extended by transmitting and amplifying a DAS signal along multiple spans of a first optical fiber, routing or bypassing the DAS signal from the first optical fiber to a second optical fiber different from the first fiber via a high-loss loopback architecture, and returning and amplifying the DAS signal along the same multiple spans back to a DAS device. The DAS device may then receive and process the DAS signal to detect any changes in the DAS environment. The loopback configuration may be based on different types of loopback architecture.

In one embodiment, a system may include a first optical fiber, where the first optical fiber may provide a transmit path for a distributed acoustic sensing (DAS) signal to propagate in a first direction, and a second optical fiber, where the second optical fiber may provide a return path for the DAS signal to propagate in a second direction opposite of the first direction. The system may further include at least a first optical amplifier coupled to and arranged along the first optical fiber, at least a second optical amplifier coupled to and arranged along the second optical fiber, and a loopback fiber having a first end and a second end, where the first end of the loopback fiber may be coupled to the first optical fiber at a first coupling point and where the second end of the loopback fiber may be coupled to the second optical fiber at a second coupling point.

In another embodiment, a method may include transmitting, by a distributed acoustic sensing (DAS) device, a DAS signal along a first optical fiber, receiving, by the DAS device, the DAS signal via a second optical fiber, and performing, by the DAS device, processing on the received DAS signal. For example, the transmitted DAS signal may be routed or bypassed from the first optical fiber to the second optical fiber via a loopback fiber having a first end and a second end, where the first end of the loopback fiber may be coupled to the first optical fiber at a first coupling point and where the second end of the loopback fiber may be coupled to the second optical fiber at a second coupling point.

In yet another embodiment, an apparatus may include at least a first optical amplifier, where the first optical amplifier may have a first input, a first output, and an amplification path in a first direction, and at least a second optical amplifier, where the second optical amplifier may have a second input, a second output, and an amplification path in a second direction opposite to the first direction. The apparatus may further include a loopback fiber having a first end and a second end, where the first end of the loopback fiber may be coupled at a first coupling point associated with the first optical amplifier and where the second end of the loopback fiber may be coupled at a second coupling point associated with the second optical amplifier.

DESCRIPTION OF EMBODIMENTS

Figure 1:
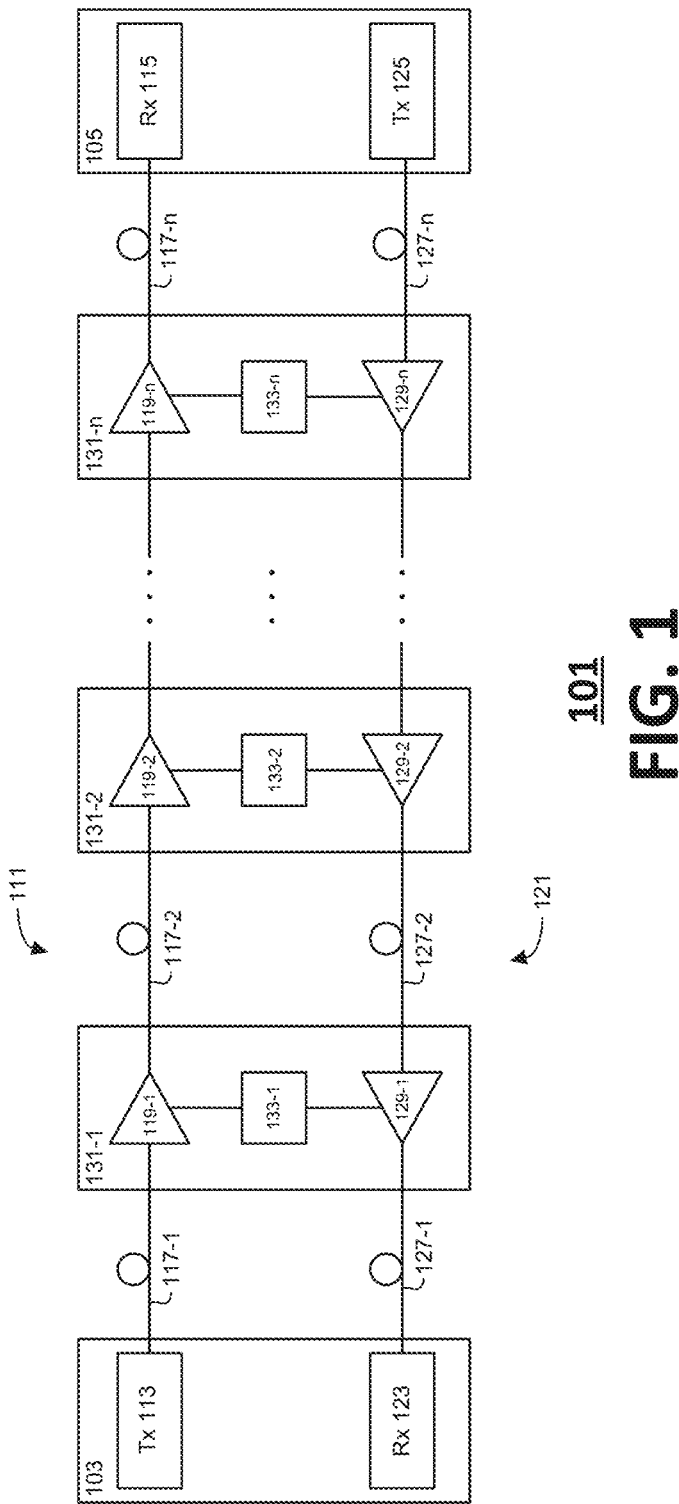
FIG. 1 illustrates an example optical communication system.

The present invention is directed to techniques for extending the range of distributed acoustic sensing (DAS) in undersea optical cables using loopback technology. According to embodiments, a DAS signal (e.g., light signal) may be transmitted by a DAS device (e.g., DAS interrogator) from a first end of an optical cable. This DAS signal may be referred to as a transmit DAS signal. The transmit DAS signal may propagate along a first optical fiber of a bidirectional fiber pair of the optical cable in a first direction and may be periodically amplified by one or more optical amplifiers spaced along the fiber.

At a predefined distance along the optical cable (e.g., after the "Nth" amplifier along the cable), the transmit DAS signal may be returned back to the DAS device by routing or bypassing the DAS signal to a second optical fiber of the bidirectional fiber pair of the optical cable using high-loss loopback architecture. The routed or bypassed transmit DAS signal may be referred to as a return DAS signal. The return DAS signal may propagate along the second optical fiber in a second direction opposite to the first direction and may also be amplified by the one or more optical amplifiers along the fiber.

As will be further described in detail below, the DAS signal may be routed or bypassed from the first optical fiber to the second optical fiber of the bidirectional fiber pair based on different high-loss loopback architectures. In one example, the routing or bypass may be based on an output-to-output loopback architecture in which a first end of a loopback fiber is coupled to an output of an amplifier of the first optical fiber and a second opposed end of the loopback fiber is coupled to an output of an amplifier of the second optical fiber. In another example, the routing or bypass may be based on an output-to-input loopback architecture in which a first end of a loopback fiber is coupled to an output of an amplifier of the first optical fiber and a second opposed end of the loopback fiber is coupled to an input of an amplifier of the second optical fiber.

By at least (i) transmitting and amplifying a DAS signal along multiple spans of a first optical fiber, (ii) routing or bypassing the DAS signal from the first optical fiber to a second optical fiber different from the first fiber via a high-loss loopback architecture, and (iii) returning and amplifying the DAS signal along the same multiple spans back to a DAS device, the DAS range can be extended in ways that are significantly advantageous and improved over prior solutions. In conventional solutions, the DAS range is typically limited to a single fiber span (e.g., the range cannot extend beyond the first amplifier), but the DAS range extension techniques described herein at least lengthen the DAS range past the single fiber span. Advantageously, the range extension length is flexible and variable, e.g., the DAS range extension length can be designed and adjusted according to various use cases. Moreover, at least the loopback architecture allows DAS systems with extended range to be used in undersea applications since only a single DAS device is required unlike conventional DAS systems that include numerous DAS devices.

Accordingly, broader coverage provided by the extended DAS range allows a DAS system to better monitor subsea related activities. For example, the optical cables of the extended DAS system can be used to hear or monitor earthquakes, sea floor movement, ship signatures, passing of ships, dropping of anchors, dragging of fishing nets, etc. To at least that end, the optical cables effectively act as microphones to monitor potential issues or problems that may occur undersea, such as aggressions or potential aggressions to optical cables of an subsea optical communication system.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to the drawings, FIG. 1 illustrates an exemplary bidirectional optical communication system 101 which may use high-bandwidth fiber optics to transmit vast amounts of data over long distances. Thus, the bidirectional optical communication system 101 may be considered a long-haul optical communication system. Bidirectional data transmission may be implemented by constructing pairs of optical fibers within an optical cable and transmitting one or more channels, e.g., wavelength division multiplexed channels, per fiber pair.

As shown, the optical communication system 101 may include terminals 103 and 105 connected by two unidirectional optical paths 111, 121, which together form a bidirectional optical fiber pair. Optical path 111 may transmit signal(s), data, information, etc. in one direction (e.g., to the right) from a transmitter 113 at terminal 103 to a receiver 115 at terminal 105. Optical path 121 may transmit signal(s), data, information, etc. in the other direction (e.g., to the left) from a transmitter 125 at terminal 105 to a receiver 123 at terminal 103.

With respect to terminal 103, the optical path 111 is an outbound path and the optical path 121 is an inbound path. The optical path 111 may include optical fibers 117-1 to 117-*n* and optical amplifiers 119-1 to 119-*n*, and the optical path 121 may include optical fibers 127-1 to 127-*n* and optical amplifiers 129-1 to 129-*n*. The optical fibers 117-1 to 117-*n* and 127-1 to 127-2 may be individual segments of a single optical fiber 117 and a single optical fiber 127, respectively, where the segments are formed by way of the coupling of the amplifiers to the optical fibers 117 and 127, as shown.

In examples, the one or more of the optical amplifiers 119-1 to 119-*n* and 129-1 to 129-*n* may be Erbium-doped fiber amplifiers (EDFAs). It may be understood that, in some examples, transmitter 113 and receiver 123 may be housed together as a transponder or transceiver at terminal 103, and similarly, transmitter 115 and receiver 125 may also be housed together as a transponder or transceiver at terminal 105.

The optical path pair (e.g., optical paths 111, 121) may be configured as a set of amplifier pairs 119-1 to 119-$n$ and 129-1 to 129-$n$ within repeaters 131-1 to 131-$n$ connected or coupled thereto by pairs of optical fibers 117 (e.g., via 117-1 to 117-$n$) and 127 (e.g., via 127-1 to 127-$n$), which may be included in an optical fiber cable together with other fibers or fiber pairs supporting additional path pairs. Each repeater 131 may include at least a pair of amplifiers 119, 129 for each path pair and may include additional amplifiers for additional path pairs.

The optical amplifiers 119, 129 may utilize EDFAs or other rare earth doped fiber amplifiers, e.g., Raman amplifiers, semiconductor optical amplifiers (SOAs). Coupling paths 133-1 to 133-$n$ may be coupled between optical paths 111, 121, for example, in one or more of the repeaters 131-1 to 131-$n$. It may be understood that the term "couple" or "coupled," as used herein, broadly refers to any connection, connecting, coupling, link, or linking, either a direct or indirect or a wired or wireless connection and does not necessarily imply that the coupled components or elements are directly connected to each other.

Although an exemplary embodiment of the optical communication system 101 is shown and described, variations of the optical communication system 101 are within the scope of the present disclosure. The optical communication system 101 may include, for example, more optical path pairs and more or fewer repeaters. Alternatively, the optical communication system 101 may not include any optical amplifiers or may include, instead of optical amplifiers, optical pump power sources suitable for implementing optical gain by Raman amplification within optical fibers connecting repeaters, or within optical fibers contained within one or more repeaters 131. It may also be understood that the transmitters, receivers, transponders, transceivers, etc. that have transmitting and/or receiving capabilities (or any other suitable device for transmitting and receiving data) may include at least one memory and one or more processors (e.g., CPU, ASIC, FGPA, any conventional processor, etc.) to execute instructions stored in memory.

Moreover, as will be further described below, one or more of the terminals 103, 105 may include or may be coupled to at least one distributed acoustic sensing (DAS) device, such as a DAS interrogator. For example, the DAS device may be configured to transmit one or more DAS signals on an outbound path (which, in the context of DAS, may be referred to as a transmit path) and receive the one or more DAS signals on an inbound path (which may be referred to as a return path). The transmit and return paths may be provided by the optical fibers 117 and 127, as illustrated in the optical communication system 101, or may be provided by separate optical fibers of a DAS-dedicated fiber pair, which may be also connected or coupled to the repeaters 131-1 to 131-$n$ (similar to the optical fibers 117 and 127).

Figure 2:
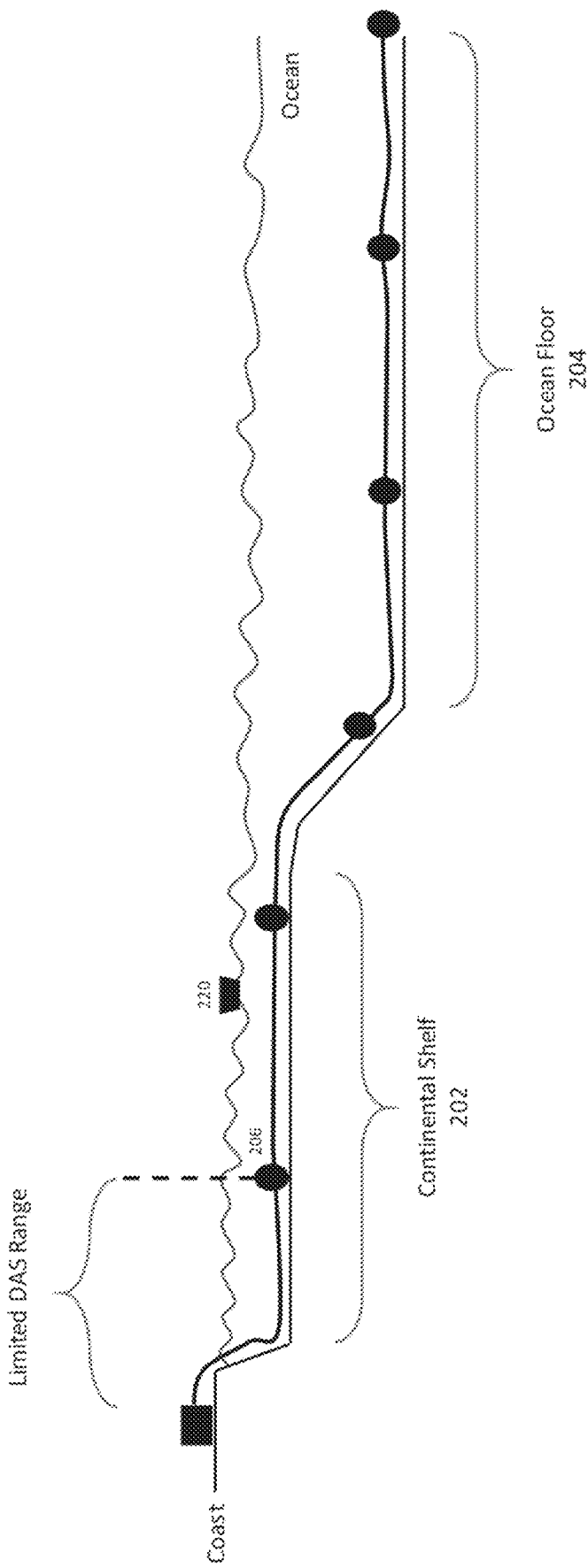
FIG. 2 illustrates an example of limited DAS range.

FIG. 2 illustrates an example 200 of limited DAS range according to embodiments. The example 200 shows the limitation of conventional DAS systems when implemented in undersea applications, such as long-haul undersea optical communication applications. As illustrated, one end of an optical cable may be connected to a terminal at a first location (e.g., first landmass). The terminal may include a DAS device for transmitting and receiving a DAS signal, or alternatively, the DAS device may be separately housed and coupled to the optical cable. The optical cable may be laid along a continental shelf 202 and further laid along the ocean floor 204 until the other end of the optical cable reaches a terminal at a second location (e.g., second landmass), which is not shown in FIG. 2.

To account for signal attenuation, numerous optical repeaters may be coupled to and arranged along the optical cable at predefined intervals between the two opposed terminals to amplify signal(s) propagating along the fibers of the optical fiber. In conventional DAS systems, the DAS device may transmit a DAS signal, which may travel along an outbound fiber path until the DAS signal reaches repeater 206 (e.g., the repeater arranged closest to the terminal at the first landmass, as shown. Thereafter, the DAS signal may be reflected back and may propagate along the same fiber path back to the DAS device.

Accordingly, the DAS range is limited to only a single fiber span (e.g., the fiber span between the DAS device and the repeater 206), and thus, the DAS range does not and cannot extend beyond the repeater 206. This is because certain passive components, such as optical amplifiers, that are coupled to the amplifier allow light signals to propagate in only one direction, e.g., the outbound direction. To at least that end, when the DAS signal passes through the repeater 206, the signal cannot properly reflect and return back to the DAS device.

Additionally, it is understood that the DAS range cannot extend beyond the typical physical DAS range limit of approximately 50 km. Thus, even if repeater 206 is arranged further than 50 km from the DAS device, the DAS range will be physically limited to approximately 50 km.

Because of the limited DAS range, activities occurring outside or beyond such range cannot be properly detected or monitored. For example, ship 220 may be dragging an anchor along the continental shelf 202, but the conventional DAS system would not be able to detect or monitor the such activity and appropriately determine the likelihood of an aggression on the optical cable.

Figure 3:
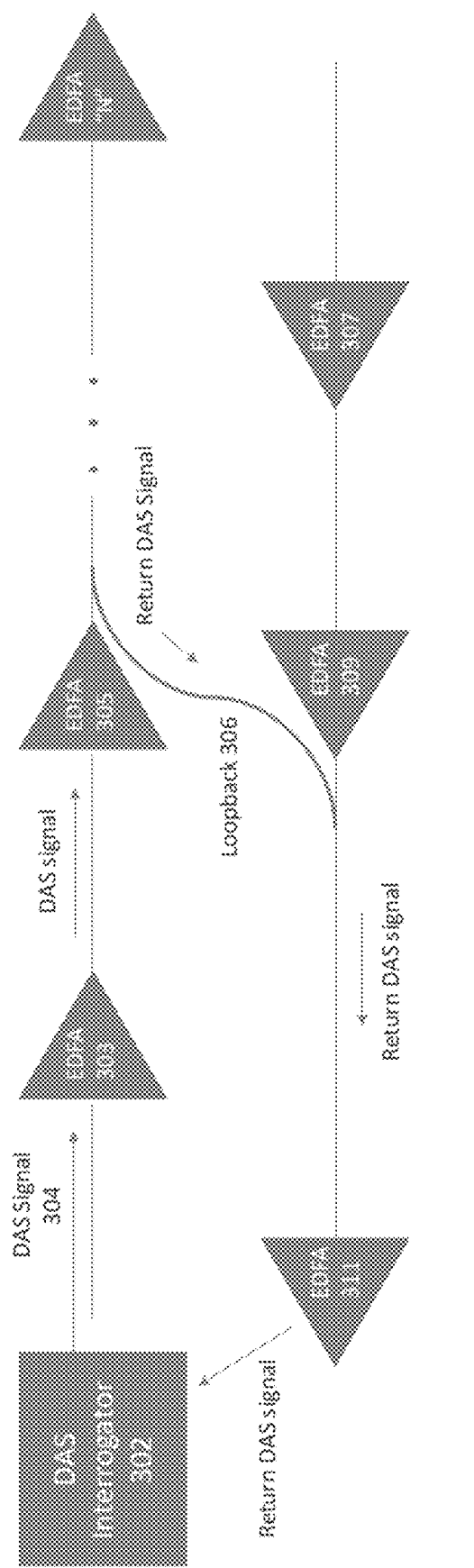
FIG. 3 illustrates a first example loopback architecture.

FIG. 3 illustrates an example loopback architecture 300 according to embodiments. As described above, a high-loss loopback architecture may be employed to route or bypass a DAS signal from a first optical fiber to a second optical fiber in order to overcome the range limitation problem described above with respect to FIG. 2.

For example, a DAS interrogator 302 may be configured to transmit a DAS signal, receive the signal, and perform processing on the received signal to extract acoustic characteristics or signatures of the undersea environment based at least in the part on the processing. In at least that regard, the DAS interrogator may include appropriate hardware components, such as memory, one or more processors, interfaces, etc. to generate, transmit, receive, and analyze the DAS signal. The DAS interrogator 302 may be included and housed in a terminal, or alternatively, may be a standalone device.

As shown, the DAS interrogator 302 may be coupled to a first optical fiber, which provides the transmit path. When the DAS signal is transmitted by the DAS interrogator, the signal propagates along the transmit path and is periodically amplified by EDFAs 303 and 305. As further shown, a loopback fiber 306 may be provided. For example, a first end of the loopback fiber 306 may be coupled to the first optical fiber at a coupling point and a second end of the loopback fiber 306 may be coupled to a second optical fiber at a coupling point, where the loopback fiber 306 provides the return path for the DAS signal. In examples, the loopback fiber 306 is configured as and/or provides a high-loss loopback path. Thus, via the loopback fiber 306, the DAS signal on the transmit path is routed or bypassed to the second optical fiber—the return path—such that the DAS signal propagates along the return path and amplified by at least EDFA 311 and returned back to the DAS interrogator 302, as illustrated.

It may be understood that the first and second optical fibers providing the transmit and return paths, respectively, may be included in or form a bidirectional optical fiber pair. This fiber pair may be a standalone DAS-dedicated fiber pair, or alternatively, may be a payload carrying fiber pair in which case the DAS signal may have a wavelength outside the payload channel wavelengths so that the DAS signal does not interfere with the payload signals. It may further be understood that every "Nth" opposing set of amplifiers (e.g., the Nth amplifier coupled to the first optical fiber and the Nth amplifier coupled to the second optical fiber) may be paired and housed in a same repeater (e.g., similar to the repeaters illustrated in FIG. 1).

As further shown in FIG. 3, the loopback architecture 300 may be based on an output-to-output architecture. For example, the coupling point of the first end of the loopback fiber 306 to the first optical fiber may be at an output of EDFA 305 and the coupling point of the second end of the loopback fiber 306 to the second optical fiber may be at an output of EDFA 309. This, for instance, ensures that at least the DAS signal is amplified by EDFA 305 prior to routing or bypassing the signal, as a return DAS signal, to the second optical fiber and eventually back to the DAS interrogator 302. Accordingly, based on the output-to-output loopback architecture, the DAS signal is boosted or amplified at least twice, via EDFA 305 and EDFA 311, prior to returning to the DAS interrogator 302.

As will be further described in detail below, the location of the coupling points of the first and second ends of the loopback fiber 306 may determine the extension length of the DAS range. For instance, if EDFA 305 is the "Nth" repeater, then the DAS range is extended by at least "N" fiber spans. Thus, by providing bidirectional fiber pairs to transmit and return a DAS signal via the loopback fiber 306, the DAS range can be significantly extended.

Figure 4:
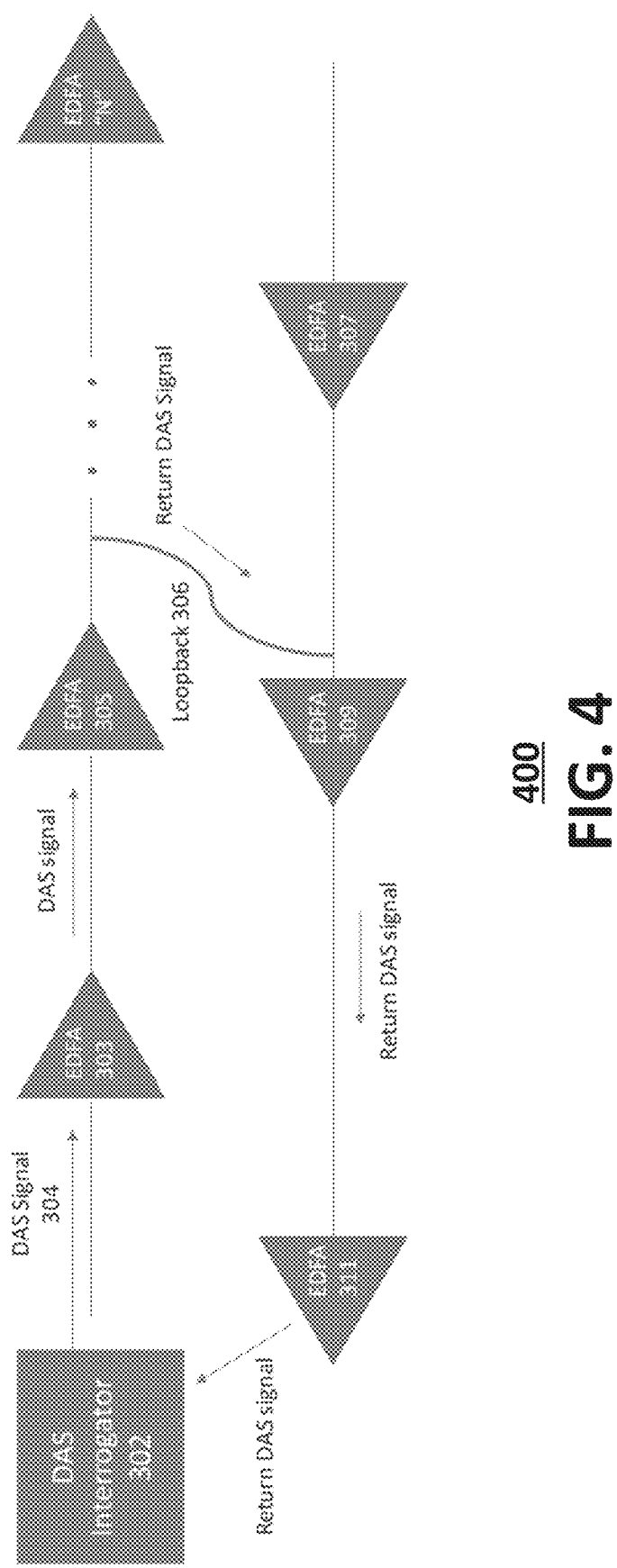
FIG. 4 illustrates a second example loopback architecture.

FIG. 4 illustrates an example loopback architecture 400 according to embodiments. For ease of explanation, the components of loopback architecture 300 described above with respect to FIG. 3 will be used to describe the loopback architecture 400 of FIG. 4. As shown, the components and configuration of the loopback architecture 400 is substantially similar to the components and configuration of the architecture 300 described above except for loopback fiber 306 and the coupling thereof.

For example, the loopback architecture 400 may be based on an output-to-input architecture. As illustrated, the coupling point of the first end of the loopback fiber 306 to the first optical fiber may be at an output of EDFA 305. But, in this architecture, the coupling point of the second end of the loopback fiber 306 to the second optical fiber may be at an input of EDFA 309. In at least that regard, architecture 400 ensures that at least the DAS signal is amplified by EDFA 305, EDFA 309, and EDFA 311 prior to routing or bypassing the signal, as a return DAS signal, to the second optical fiber and eventually back to the DAS interrogator 302. Thus, the output-to-input loopback architecture boosts the DAS signal at least three times before it returns to the DAS interrogator 302. In some examples or use cases, the output-to-input loopback architecture may be preferable due to, for instance, increased signal-to-noise (SNR) issues in the DAS system.

Although FIGS. 3 and 4 illustrate just the loopback fiber 306, other additional components, such as couplers, filters, tuners, etc., may be used (or, in some examples, required) to facilitate the coupling of the loopback fiber 306 and properly allow the high-loss loopback features to properly function.

Figure 5:
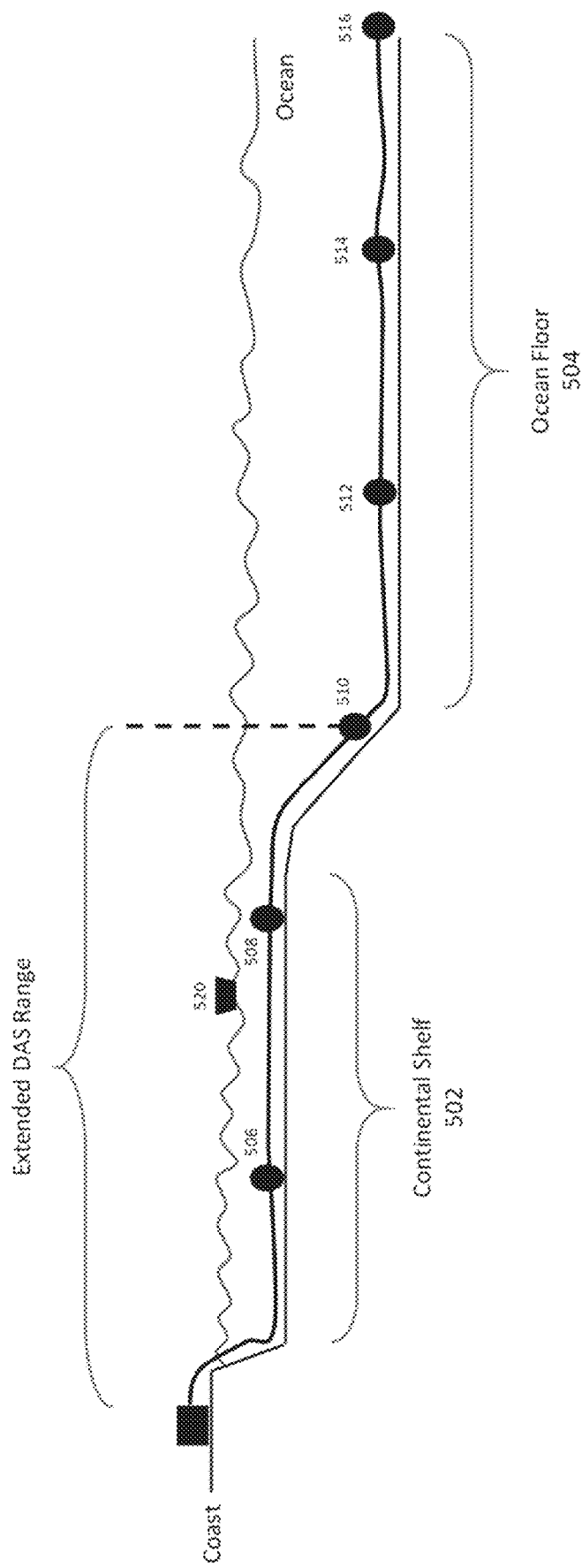
FIG. 5 illustrates a first example of extended DAS range.

FIG. 5 illustrates an example 500 of extended DAS range according to embodiments. For ease of explanation, the undersea environment and application illustrated in FIG. 2 will be used to describe the extended DAS range of example 500. For example, a high-loss loopback architecture (e.g., output-to-output, output-to-input) via at least one loopback fiber may be configured at a location associated with repeater 510.

By doing so, a DAS signal may be transmitted from a DAS interrogator (located at the coast), which propagates along a first optical fiber and periodically amplified by the EDFAs in repeaters 506, 508, and 510, and is routed or bypassed to a second optical fiber via the at least one loopback fiber so that the DAS signal can be amplified in the opposite direction and returned back to the DAS interrogator. Accordingly, the configuration of the loopback fiber at the location associated with the repeater 510 allows for an extended DAS range up to approximately that repeater 510. Thus, ship 520 (e.g., ship acoustic signature), its activities (e.g., dragging of anchor, dragging of fishing net), and potential aggressions it can cause on the optical cable of the undersea communication system can be monitored by way of at least the extended DAS range, which is advantageous over the conventional limited DAS range shown in FIG. 2.

Figure 6:
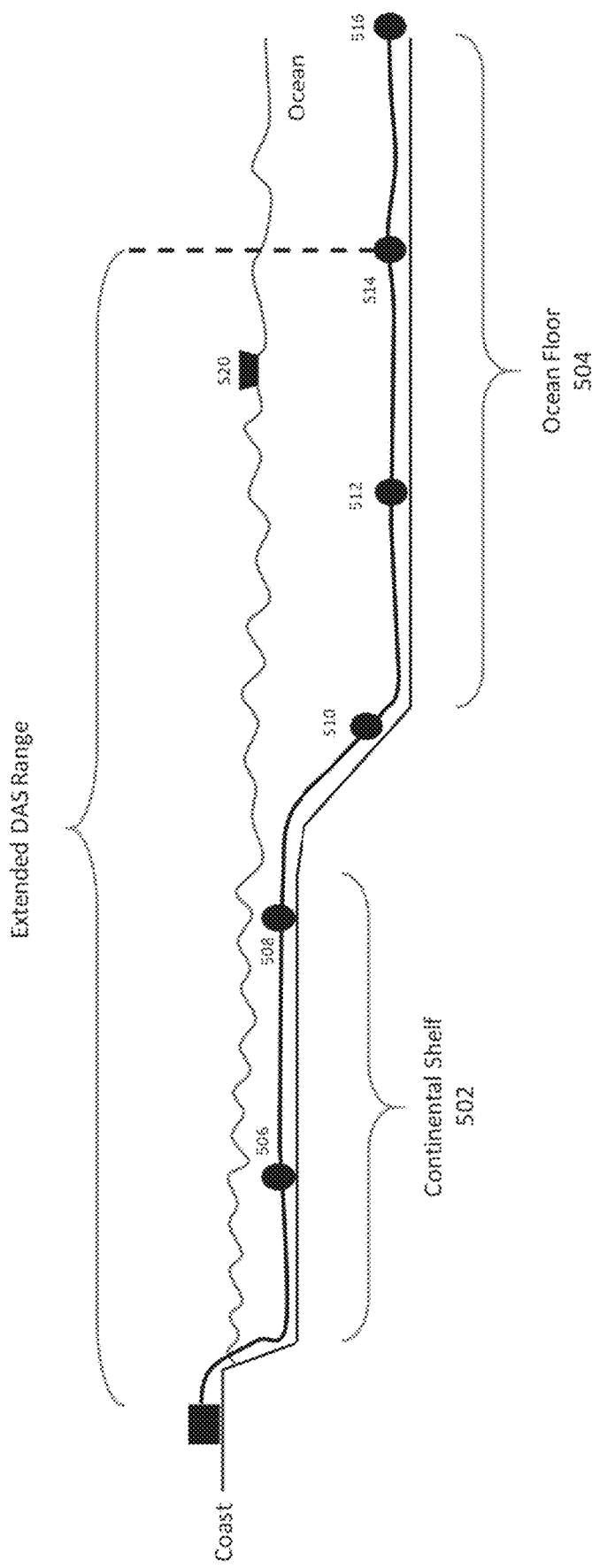
FIG. 6 illustrates a second example of extended DAS range.

FIG. 6 illustrates an example 600 of extended DAS range according to embodiments. As illustrated, example 600 is similar to example 500, except the loopback fiber can be configured at a location associated with a repeater further away than repeater 510, which extends the DAS range even further. For example, the high-loss loopback fiber may be coupled between the first and second optical fibers at a location associated with repeater 514. Thus, activities occurring beyond the continental shelf 502 may be monitored by the DAS interrogator. If, for instance, the ship 520 conducts fishing activities further out in the ocean, those activities can be effectively monitored and analyzed by way of at least the further extended DAS range, as shown.

Figure 7:
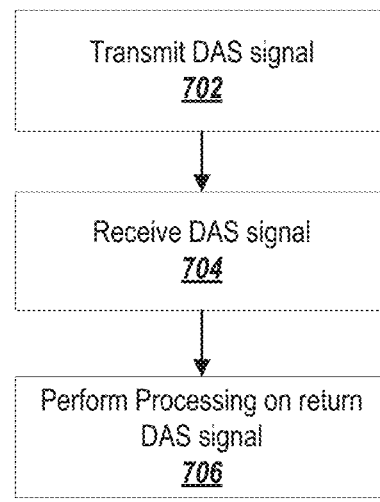
FIG. 7 illustrates a first example flow diagram.

FIG. 7 illustrates an example flow diagram 700 of DAS using loopback technology according to embodiments. For example, the distributed acoustic sensing illustrated in flow diagram 700 may be performed by a DAS interrogator, which may be coupled to a bidirectional optical fiber pair (e.g., dedicated DAS fiber pair, already existing optical system payload carrying fiber pair). At block 702, the DAS interrogator may transmit the DAS signal via a first optical fiber of the bidirectional fiber pair. As described above, the DAS signal may propagate along the first fiber and amplified periodically by one or more amplifiers until the signal is routed or bypassed to a second optical fiber of the bidirectional fiber pair via a high-loss loopback fiber. The loopback fiber may be coupled according to different loopback architectures, such as output-to-output and output-to-input, as described above.

The return DAS signal may be routed or bypassed to the second optical fiber, where the return DAS signal is amplified by one or more amplifiers and propagated on the return path until the DAS signal returns to the DAS interrogator. And, at block 704, the DAS interrogator may receive the DAS signal via the second optical fiber.

At block 706, the DAS interrogator may perform processing on the return DAS signal. In examples, the processing may be based on any DAS-based reflectometry and/or interferometry analysis, etc. for at least determining, identifying, extracting, or deciphering acoustic information in the DAS environment. It may be understood that the DAS signal may be a light signal (e.g., laser pulse) or the like. Based on the processing, the DAS interrogator may be able to monitor the DAS environment to predict or determine whether, for example, an aggression on the optical cable in the DAS environment is likely to occur in response to various acoustic signatures or characteristics of the undersea environment, such as noises or sounds related to ships, sea floor movement, earthquakes, anchor drops, dragging of anchors, dragging of fishing nets, etc.

Herein, novel and inventive techniques for extending DAS range in optical cables using loopback technology are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
    a plurality of optical fiber pairs in an undersea cable, each of said optical fiber pairs capable of carrying wavelength division multiplexed payload channels;
    one pair of the plurality of optical fiber pairs providing a bidirectional transmission path for an optical distributed acoustic sensing (DAS) signal wherein a first optical fiber of the one pair of optical fiber pairs providing a transmit path for the DAS signal to propagate in a first direction and a second optical fiber of the one pair of optical fiber pairs providing a return path for the DAS signal to propagate in second direction opposite the first direction;
    at least a first optical amplifier coupled to and disposed along the first optical fiber;
    at least a second optical amplifier coupled to and disposed along the second optical fiber; and
    a loopback fiber having a first end and a second end,
    wherein the first end of the loopback fiber is coupled, at a first coupling point, to the first optical fiber at an output of the first optical amplifier, and
    wherein the second end of the loopback fiber is coupled, at a second coupling point, to an input of the second optical amplifier at a second coupling point.

2. The system of claim 1, further comprising:
    a DAS interrogator,
    wherein the DAS interrogator is coupled to the first and second optical fibers, and
    wherein the DAS interrogator is configured to: (i) transmit the DAS signal via the first optical fiber, (ii) receive the DAS signal via the second optical fiber, and (iii) and perform analysis on the received DAS signal to detect any change in a DAS environment.

3. The system of claim 2, further comprising:
    a third optical amplifier coupled to and arranged along the first optical fiber; and
    a fourth optical amplifier coupled to and arranged along the second optical fiber,
    wherein the third optical amplifier is arranged further away from the DAS interrogator than the first optical amplifier, and
    wherein the fourth optical amplifier is arranged further away from the DAS interrogator than the second optical amplifier.

4. The system of claim 3, wherein the first coupling point is at an output of the third optical amplifier and wherein the second coupling point is at an input of the fourth optical amplifier.

5. The system of claim 1, wherein the one pair of the plurality of the optical fiber pairs is: (i) a fiber pair separate from any wavelength division multiplexed payload channels or (ii) a fiber pair capable of carrying a wavelength division multiplexed payload channel.

6. The system of claim 1, wherein the first and second optical amplifiers are included in a same repeater.

7. The system of claim 1, wherein the loopback fiber is configured as a high-loss loopback path.

8. A method comprising:
    transmitting, by a distributed acoustic sensing (DAS) device, a DAS signal along a first optical fiber, said first optical fiber being part of a first fiber pair within an optical communications cable having a plurality of fiber pairs each capable of carrying wavelength division multiplexed payload channels;
    receiving, by the DAS device, the DAS signal via a second optical fiber, said second optical fiber being part of the first fiber pair within the optical communications cable having a plurality of fiber pairs, said first optical fiber of the first fiber pair carrying the DAS signal in a first direction along the optical communications cable and the second optical fiber of the first fiber pair carrying the DAS signal in a second direction opposite the first direction along the optical communications cable; and
    performing, by the DAS device, processing on the received DAS signal,
    wherein the transmitted DAS signal is routed or bypassed from the first optical fiber to the second optical fiber via a loopback fiber, the loopback fiber having a first end coupled to the output of a first optical amplifier disposed along the first optical fiber and a second end coupled to an input of a second optical amplifier disposed along the second optical fiber.

9. The method of claim 8, wherein the first fiber pair defines a bidirectional optical communications path within the optical communications cable, and wherein the first fiber pair is: (i) a fiber pair separate from any payload carrying fiber pair or (ii) a fiber pair capable of carrying a wavelength division multiplexed payload channel.

10. The method of claim 8, wherein the loopback fiber is configured as a high-loss loopback path.

* * * * *